United States Patent

Lund

(10) Patent No.: US 6,726,234 B2
(45) Date of Patent: Apr. 27, 2004

(54) HITCH ROTOR CONTROL SYSTEM AND APPARATUS

(75) Inventor: Raymond R. Lund, Asheville, NC (US)

(73) Assignee: TRN Business Trust, Dallas, TX (US)

(*) Notice: Subject to any disclaimer, the term of this patent is extended or adjusted under 35 U.S.C. 154(b) by 0 days.

(21) Appl. No.: 09/788,247

(22) Filed: Feb. 15, 2001

(65) Prior Publication Data

US 2002/0109334 A1 Aug. 15, 2002

(51) Int. Cl.⁷ .............................................. B62D 53/06
(52) U.S. Cl. ..................... 280/438.1; 280/434
(58) Field of Search .................. 280/432, 433, 280/434, 437, 438.1, 441.1, 407.1, 446.1, 510, 508, 512

(56) References Cited

U.S. PATENT DOCUMENTS

| | | | | |
|---|---|---|---|---|
| 3,268,250 A | * | 8/1966 | Ferris | 280/434 |
| 3,484,124 A | * | 12/1969 | Wille | 248/188 |
| 3,536,282 A | * | 10/1970 | Ferris | 116/200 |
| 3,565,459 A | * | 2/1971 | Reid | 280/477 |
| 3,589,754 A | * | 6/1971 | Randolph et al. | 403/13 |
| 3,647,248 A | * | 3/1972 | Ferris et al. | 280/434 |
| 3,759,546 A | * | 9/1973 | Slaven | 280/432 |
| 3,815,937 A | * | 6/1974 | Hodgson | 280/432 |
| 3,868,127 A | * | 2/1975 | Marulic et al. | 280/434 |
| 3,892,426 A | * | 7/1975 | Ferris | 280/432 |
| 3,964,766 A | * | 6/1976 | Ferris et al. | 280/433 |
| 4,185,564 A | | 1/1980 | Stoller et al. | 410/64 |
| 4,193,350 A | | 3/1980 | Niggemeier et al. | 410/64 |
| 4,216,726 A | | 8/1980 | Stoller et al. | 410/64 |
| 4,225,276 A | | 9/1980 | Stoller et al. | 410/64 |
| 4,230,430 A | | 10/1980 | Stoller et al. | 410/59 |
| 4,407,617 A | * | 10/1983 | Hammonds et al. | 280/435 |
| 4,659,101 A | * | 4/1987 | Buckley | 280/434 |
| 4,826,198 A | * | 5/1989 | Herbert | 280/432 |
| 5,028,067 A | * | 7/1991 | Madura | 280/433 |
| 5,452,664 A | | 9/1995 | Richmond | 105/4.1 |
| 5,566,963 A | * | 10/1996 | Johnson | 280/405.1 |
| 5,647,604 A | * | 7/1997 | Russell | 280/492 |
| 5,988,665 A | * | 11/1999 | Terry et al. | 280/434 |
| 6,047,982 A | * | 4/2000 | McClure et al. | 280/515 |
| 6,260,872 B1 | * | 7/2001 | Budhram | 280/432 |
| 6,340,167 B1 | * | 1/2002 | Boyd | 280/432 |

* cited by examiner

Primary Examiner—Brian L. Johnson
Assistant Examiner—Kelly E Campbell
(74) Attorney, Agent, or Firm—Baker Botts L.L.P.

(57) ABSTRACT

A hitch (10) with a lock indicator system (16) interacts with a rotor (18) to provide an indication that a kingpin (14) is properly inserted into the hitch. The rotor rotates in response to proper insertion of the kingpin to align a rotor slot (20) with a plunger (24). Once the rotor slot and the plunger are aligned, an indicator (28) moves from a first position, indicating an unlocked kingpin, to a second position, indicating a locked kingpin. A control pin (74, 174) prevents rotation of the rotor from improper insertion of the kingpin. The control pin is controlled by a control lever (70, 170).

19 Claims, 3 Drawing Sheets

US 6,726,234 B2

HITCH ROTOR CONTROL SYSTEM AND APPARATUS

TECHNICAL FIELD OF THE INVENTION

This invention relates in general to trailer hitch systems and, more particularly, to a system and apparatus for hitch rotor control.

BACKGROUND OF THE INVENTION

Most loading of highway trailers onto intermodal railcars is done from overhead. Specifically, a crane picks the trailer up, moves it over the intermodal railcar, and lowers it onto a hitch. During this process, a trailer kingpin is inserted a the locking rotor. Rotor lock indicators may show a locked condition when the locking pin is secured in the locking rotor.

SUMMARY OF THE INVENTION

During the process of loading a trailer onto an international railcar, it is possible for the trailer kingpin to be improperly inserted into the locking rotor. If this occurs, the rotor lock indicators may show a locked condition when, in fact, the kingpin is not actually secured. An incorrect indication of a locked condition may result in the failure to ensure that the trailer is properly secured on the railcar. In this situation, the trailer may become detached from a railcar during movement of the railcar. In particular, rotation of a rotor in a hitch on the railcar in response to a torque moment from an improperly inserted kingpin may cause a locked kingpin indication to be reported by a kingpin lock indication system. From the foregoing, it may be appreciated that there is a need for a hitch rotor control system for preventing rotation of the rotor in response to an improperly inserted kingpin.

According to an embodiment of the present invention, a system and apparatus are provided to address the shortcomings of prior hitches. A hitch rotor control apparatus has a control lever with a first end and a second end. The first end is pivotally coupled to a pivot pin. The control lever is engageable with a kingpin. The apparatus also has a control pin coupled to the lever which is insertable into a slot in a rotor.

According to another embodiment of the present invention, a hitch rotor control apparatus includes a rotor coupled to a hitch and operable to rotate from a first position to a second position. The hitch has a recess disposed therein. The apparatus also includes a control pin coupled to the rotor and disposed within the recess. The apparatus further comprises a control lever having a first end and a second end. The first end is pivotally coupled to a first pivot pin. The control lever is engageable with a kingpin. The apparatus further comprises a control arm pivotally coupled to a second pivot pin and engageable with the control lever. The control arm is operable to pivot between a first position and a second position. The control arm is disposed within the recess in the first position and the control arm is remote from the recess in the second position.

According to yet another embodiment of the present invention, a hitch system for securing semi-trailers to railroad cars comprises a plate disposed within a hitch. The system further comprises a rotor rotationally coupled to the plate and having a slot disposed along an outer edge thereof. The system further comprises a lever having a first end pivotally coupled to the plate and a second end. The lever is engageable with a kingpin. The system further comprises a rotor control pin coupled to the lever and engageable with the slot. The system further comprises a tension element coupled to the plate and the second end.

The present invention provides a number of technical advantages. One such technical advantage is that improper insertion of the kingpin will not cause kingpin lock indication system to incorrectly report a locked kingpin. A further advantage is that rotation of the rotor is prevented unless the kingpin has been properly inserted. Yet another advantage is that a status indicator indicates the operational status of a control pin used to control rotation of the rotor.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Traditional hitches allow a lock indicator to indicate a locked condition even when the kingpin is not properly locked into the hitch. If the kingpin is lowered directly onto a rotor of the hitch, a torque moment may be caused by the movement of the kingpin resulting in the rotor rotating even though the kingpin is not properly inserted. Among other things, the present invention provides a rotor control lever which prevents rotation of the rotor unless the kingpin is properly inserted.

Figure 1:
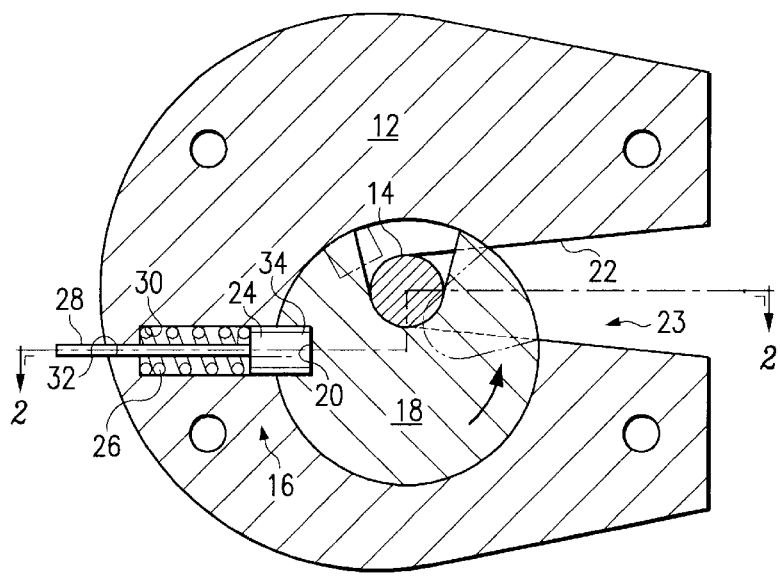
FIG. 1 is a top view showing a hitch with a kingpin lock indicator.

FIG. 1 is a top view of a hitch with a kingpin lock indicator. A hitch 10 includes a fifth wheel 12, a kingpin lock indication system 16, a rotor 18, a rotor slot 20, a hitch channel 22 and a rotor channel 23. The hitch 10 is operable to receive and lock therein a kingpin 14. Fifth wheel 12 may be any of a variety of fifth wheel systems well known in the art, such as a fifth wheel used with hitch systems on intermodal railcars. Kingpin 14 may be any of a variety of well-known kingpins commonly used in the trucking industry and preferably is a solid cylinder and includes a circumferential channel 36 and a lower end 38. Rotor 18 is a locking element for securing kingpin 14 in hitch 10. Rotor slot 20 is a recess extending partially into and at least partially through rotor 18. Hitch channel 22 and rotor channel 23 allow insertion of kingpin 14 into hitch 10 and later removal therefrom when hitch channel 22 and rotor channel 23 are aligned.

The kingpin lock indication system 16 includes a lock plunger 24, a biasing device such as spring 26, and an indicator 28. Lock plunger 24 and spring 26 are disposed within a recess 30. Lock plunger 24 may be generally cylindrical or may have any other appropriate shape. Preferably, the shape of lock plunger 24 corresponding to the shape of recess 30. Preferably, lock plunger 24 which is coupled to indicator 28. Lock plunger 24 may also be coupled to spring 26. Lock plunger 24 preferably includes a chamfer 34 at an end surface thereof. Indicator 28 is preferably a generally straight rod extending outwardly from fifth wheel 12 and may also be any other suitable lock indicator. Indicator 28 extends through a portion of the recess 30 and through an indicator channel 32.

When no kingpin 14 has been inserted into hitch 10, rotor 18 maintains rotor slot 20 such that rotor slot 20 is not aligned with recess 30. The body of rotor 18 prevents plunger 24 from exiting recess 30, which maintains indicator 28 in the unlocked position.

The unlocked position of indicator 28 may be indicated by indicator 28 extending outwardly from hitch 10 and indicates that insertion and locking of kingpin 14 has not occurred.

Proper and, in traditional systems, improper insertion of kingpin 14 will cause rotor 18 to rotate and align rotor slot 20 with recess 30 (shown by dashed outline of rotor slot 20 in FIG. 1). The aligning of rotor slot 20 and recess 30 allows spring 26 to push plunger 24 into rotor slot 20. Movement of plunger 24 into rotor slot 20 pulls indicator 28 to the locked position. The locked position of indicator 28 is indicated by indicator 28 not extending visibly outward from hitch 10 and indicates insertion and locking of kingpin 14 in hitch 10. However, traditional systems may indicate a locked condition when kingpin 14 is not properly locked. To unlock, plunger 24 is manually extracted from slot 20 and maintained in the removed position by an external restraint. Rotor 18 is then rotated when kingpin 14 is moved to the right. Removal of kingpin 14 will rotate rotor 18 in a clockwise direction, which will cause rotor slot 20 to move away from recess 30. The movement of rotor slot 20 away from recess 30 will interact with chamfer 34 on plunger 24 to overcome the resistance of spring 26 and push locked plunger 24 entirely back into recess 30 which returns indicator 28 to unlocked position.

During proper operation, kingpin 14 is inserted into hitch 10 through hitch channel 22 and rotor channel 23. In response to insertion of kingpin 14 through channels 22 and 23, rotor 18 rotates. More specifically, after kingpin 14 is inserted into hitch 10 through hitch channel 22 and rotor channel 23, kingpin 14 is moved in hitch channel 22 from right to left. The right to left movement of kingpin 14 causes rotor 18 to rotate counter-clockwise.

The rotational path of rotor 18 is predetermined such that proper insertion of kingpin 14 will rotate rotor 18 counter-clockwise. Rotation of rotor 18 locks kingpin 14 into hitch 10 such that kingpin 14 is prevented from exiting hitch 10 through hitch channel 22. The rotation of rotor 18 causes hitch channel 22 and rotor channel 23 to become nonaligned as shown, for example, by the dotted lines in FIG. 1. This nonalignment prevents removal of kingpin 14 from hitch 10.

As rotor 18 rotates due to proper kingpin 14 insertion through hitch channel 22 and rotor channel 23, rotor slot 20 becomes generally aligned with lock plunger 24. As described above, alignment of rotor slot 20 with lock plunger 24 allows kingpin lock indication system 16 to indicate that kingpin 14 is in the locked position.

Improper insertion of kingpin 14 into hitch 10, in traditional hitches, may also cause rotation of rotor 18. Specifically, when kingpin 14 is improperly lowered directly onto rotor 18, lower end 38 rests on an upper surface of rotor 18 instead of sliding through channels 22 and 23. The movement force from lower end 38 may cause a torque moment at rotor 18, for example, if lower end 38 pushes downwardly against an upper edge of rotor channel 23. The torque moment may be sufficiently strong to cause rotation of rotor 18 even though kingpin 14 is not properly inserted. Proper and improper insertion of kingpin 14 is described in more detail in associating with FIGS. 2A and 2B. The rotation of rotor 18 may align rotor slot 20 and lock plunger 24 causing a false indication that kingpin 14 is locked in position when kingpin 14 is actually only resting on rotor 18. When kingpin 18 only rests on rotor 18, movement of the railroad car associated with hitch 10 may cause the semi-trailer associated with kingpin 14 to fall off the railroad car because kingpin 14 is not secured by rotor 18.

Figure 2:
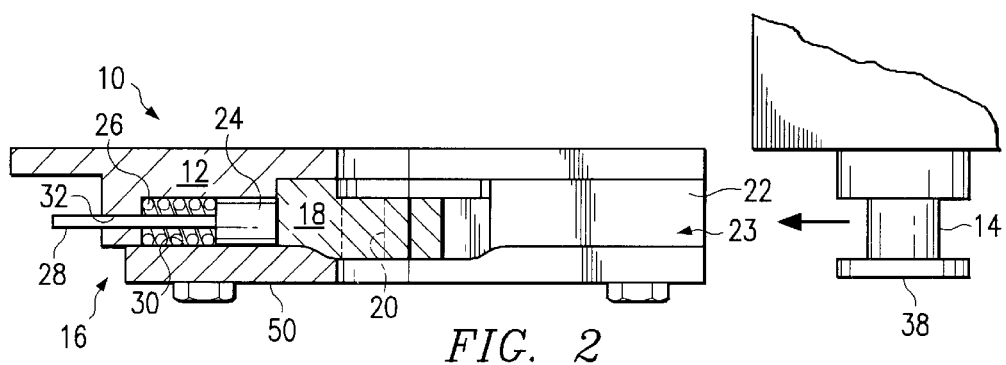
FIG. 2 is a cross-sectional view of the hitch.

FIG. 2 is a cross-sectional view of the hitch. The hitch 10 further includes a rotor support plate 50. The rotor support plate 50 provides structural support for the rotor 18 as the rotor 18 pivots within the hitch 10 between the fifth wheel 12 and the support plate 50.

Figure 2A:
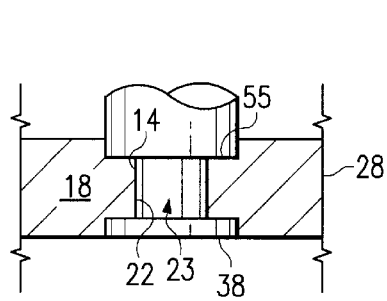
FIG. 2A is a cross-sectional view of the hitch illustrating proper insertion of a kingpin 14 in a hitch channel and a rotor channel.
Figure 2B:
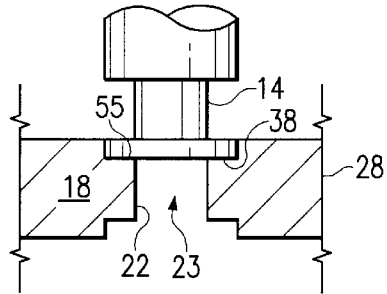
FIG. 2B is a cross-sectional view of the hitch illustrating improper insertion of the kingpin in the hitch channel and the rotor channel.

FIG. 2A is a cross-sectional view of hitch 10 illustrating proper insertion of kingpin 14 in hitch channel 22 and rotor channel 23. FIG. 2B is a cross-sectional view of hitch 10 illustrating improper insertion of kingpin 14 in hitch channel 22 and rotor channel 23. Rotor 18 includes a rotor lip 55. Rotor lip 55 allows the kingpin 14 to be improperly inserted by providing a surface on which kingpin 14 can rest. Improper insertion occurs when kingpin 14 is not completely lowered into channels 22 and 23 and then moved to the left. Improper insertion also occurs when kingpin 14 is lowered directly onto rotor 18 and then moved to the left. The configuration of rotor 18 to fit kingpin 14 creates lip 55 for an improperly loaded kingpin to sit on.

Figure 3:
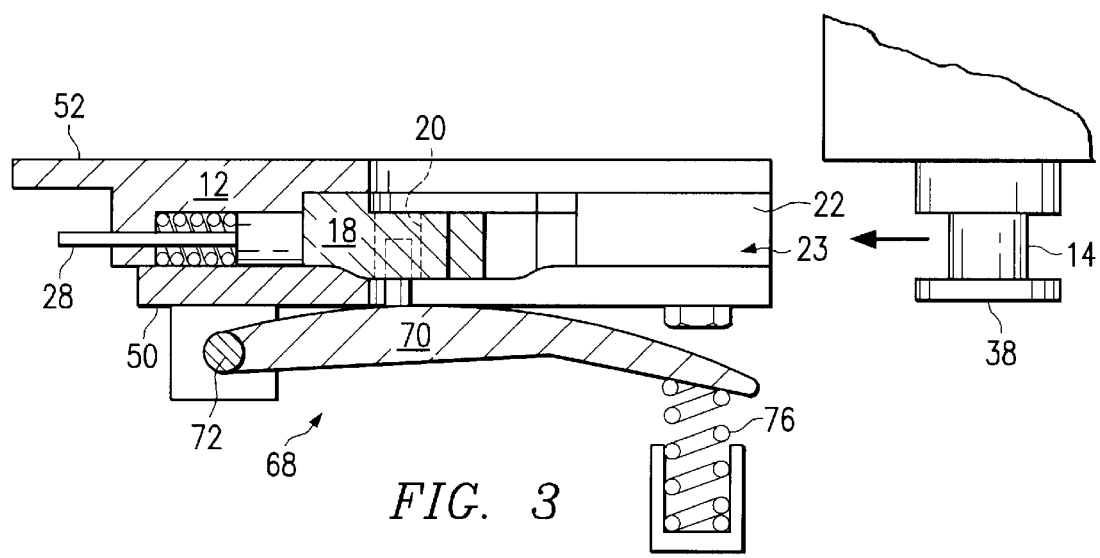
FIG. 3 is a cross-sectional view of the hitch equipped with a rotor control lever.

FIG. 3 is a cross-sectional view of the hitch equipped with a rotor control system 68. Rotor control system 68 comprises a rotor control lever 70, a pivot pin 72, a control pin 74, and a biasing device such as spring 76.

Rotor control lever 70 is an angled plate having a first end and a second end. Rotor control lever 70 is engageable with lower end 38 of kingpin 14. Rotor control lever 70 may be in a raised position or a lowered position, and is operable to pivot between the raised position and the lowered position. When rotor control lever 70 is in the raised position, control pin 74 maintains rotor 18 in a locked position in which rotation of rotor 18 is prevented. When rotor control lever 70 is in the lowered position, control pin 74 maintains rotor 10 in an unlocked position in which rotor 18 may freely rotate.

Pivot pin 72 is coupled to rotor support plate 50 and the first end of rotor control lever 70. Pivot pin 72 provides a fixed location about which rotor control lever 70 may pivot between the raised and lowered positions.

Figure 4:
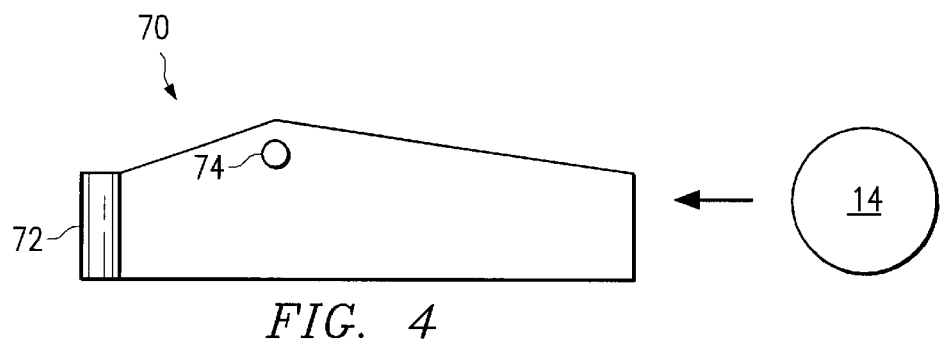
FIG. 4 is a top view of the rotor control lever.

FIG. 4 is a top view of the rotor control lever. As kingpin 14 is inserted through channels 22 and 23, lower end 38 engages rotor control lever 70. Rotor control lever 70 then pivots downwardly about pivot pin 72 in response to lower end 38. Kingpin 14 does not engage with control pin 74 because control pin 74 is offset from the insertion path of kingpin 14.

Control pin 74 projects upwardly from rotor control lever 70. Control pin 74 is coupled to a side of rotor control lever 70 and is offset from the insertion path of kingpin 14 such that kingpin 14 does not engage control pin 74 during insertion and removal through channels 22 and 23. Control pin 74 is further positioned to be insertable into rotor slot 20 when rotor channel 23 is generally aligned with hitch channel 22. In a rotor-locked position, spring 76 biases rotor control lever 70 to a raised position causing control pin 74 to be disposed within rotor slot 20 and prevent rotation of rotor 18. In a rotor-unlocked position, rotor control lever 70 is moved to the lowered position, thereby removing control pin 74 to be disposed remote from rotor slot 20 and rotor 18 is free to rotate.

Spring 76 maintains rotor control lever 70 in a rotor lock position when no kingpin 14 has been properly inserted into hitch 10. Spring 76 is preferably a spring, and may be any suitable tension element operable to maintain rotor control lever 76 in a raised position while also allowing control lever 70 to yield in response to engagement with lower end 38. Spring 76 is coupled to a spring support portion 77 of plate 50. Spring 76 yields in response to engagement of lower end 38 with rotor control lever 70.

When kingpin 14 is properly inserted into hitch 10 through channels 22 and 23, lower end 38 engages with rotor control lever 70. Rotor control lever 70 is forced downward against spring 76. The downward movement of rotor control lever 70 removes control pin 74 from rotor slot 20 which allows rotation of rotor 18. When kingpin 14 is removed from hitch 10, rotor slot 20 will rotate back into the unlocked position and spring 76 will force rotor control lever 70 back into the raised position, which re-inserts control pin 74 in rotor slot 20.

Rotor control lever 70 operates to prevent rotation of rotor 18 unless kingpin 14 is properly inserted. Improper positioning of the kingpin 14 will not engage lower end 38 with rotor control lever 70 which maintains control pin 74 in rotor slot 20. If kingpin 14 is lowered directly onto rotor 18, instead of being inserted through channels 22 and 23, a torque moment on rotor 18 caused by the downward force from kingpin 14 will be unable to cause rotation of rotor 18. In this scenario, rotor control pin 74, which is disposed within rotor slot 20, engages with rotor 18 at an edge of rotor slot 20 to prevent rotation of rotor 18 as rotor 18 attempts to rotate in response to the torque moment. In other words, because control pin 74 is disposed within rotor slot 20, rotor 18 is forced against control pin 74 as it attempts to rotate in response to the torque movement caused by kingpin 14 being moved in an attempt to insert kingpin 14 in channels 22 and 23. Control pin 74 prevents the rotation of rotor 18 by preventing rotor slot 20 from moving and thus preventing rotor 18 from rotating.

Figure 5:
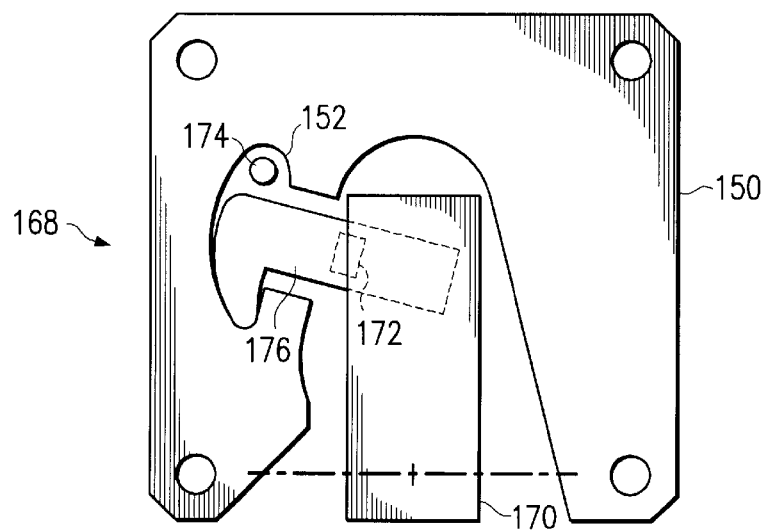
FIG. 5 is a top view of an alternate embodiment of the rotor control system.

FIG. 5 is a top view of an alternate embodiment of the rotor control system 168. Rotor control system 168 comprises a support plate 150, a control recess 152, a rotor control lever 170, a pivot pin 172, a control pin 174 and a control arm 176.

Support plate 150 is similar to support plate 50, except that support plate 150 further includes control recess 152 therein. Control recess 152 extends at least partially through support plate 150. The size of control recess 152 defines the maximum distance rotor 18 may rotate.

Rotor control lever 170 is an angled plate having a first end and a second end and is engageable with control arm 176. Rotor control lever 170 is engageable with lower end 38 of kingpin 14. Rotor control lever 170 may be in a raised position or a lowered position, and is operable to pivot between the raised position and the lowered position. Rotor control lever 170 is maintained in the raised position by a biasing device (not shown), such as a spring, similar to spring 76. In the raised position, rotor control lever 170 is disengaged from control arm 176 and in the lowered position, rotor control lever 170 is engaged with control arm 176.

Control pin 174 is coupled to rotor 18 and is disposed within control recess 152. Control pin 174 may rotate only within control recess 152, thus, the size of control recess 152 defines the maximum distance rotor 18 may rotate. When channels 22 and 23 are generally aligned, control pin 174 is in a first pin position. When rotor 18 has locked around kingpin 14 and rotor 18 has reached maximum rotation, control pin 174 is in a second pin position. Control pin 174 prevents over-rotation of rotor 18 by engaging with a wall of control recess 152 when control pin 174 is in the second pin position. Control pin 174 also operates with control arm 176 to prevent rotation of rotor 18 when kingpin 14 has been improperly inserted.

Pivot pin 172 is coupled to control arm 176 and plate 150, and provides a pivot point about which control arm 176 may pivot. Preferably, pivot pin 172 is coupled to control arm 176 in an off center position such that one end of control arm 176 responds to the force of gravity. Pivot pin 172 may be substituted with any other suitable mounting element about which control arm 176 may pivot.

Control arm 176 is coupled to pivot pin 172 and is engageable with rotor control lever 170. A first end of control arm 176 proximate control recess 152 may move between a lowered position and a raised position. When rotor control level 170 is not in a position to force a second end of control arm 176 downward (thereby raising the first end of control arm 176), the first end of control arm 176 is maintained in the lowered position. This is due to the weight of control arm 176 and the off-center positioning of pivot pin 172. In the lowered position, control arm 176 is disposed within control recess 152 and is engageable with control pin 174. In the raised position control arm 176 is raised above control pin 174 and control pin 174 may pass under control arm 176. The first end of control arm 176 moves to the raised position in response to rotor control lever 170 engaging the second end of control arm 176.

The alternate embodiment of rotor control system operates as follows. Proper insertion of kingpin 14 through channels 22 and 23 engages lower end 38 with rotor control lever 170. Lower end 38 depresses rotor control lever 170 against the biasing device and moves rotor control lever 170 to the lowered position. Depression of rotor control lever 170 engages rotor control lever 170 with control arm 176. In response to engagement with rotor control lever 170, control arm 176 pivots about pivot pin 172. This movement forces the second end of control arm 176 downward, thereby raising the first end of control arm 176 (proximate control recess 152) to the raised position. Once control arm 176 is in the raised position, control pin 174 is free to move within control recess 152 without engaging control arm 176. Once control pin 174 is free to move within control recess 152, rotor 18 is free to rotate in response to kingpin 14.

As described above, improper insertion of kingpin 14 may cause a torque moment on rotor 18 as kingpin 14 rests on rotor 18. However, improper insertion of kingpin 14 does not engage lower end 38 with rotor control lever 170. As rotor 18 attempts to rotate in response to the torque moment, control pin 174 begins to move within control recess 152. As control pin 174 begins to move within control recess 152, control pin 174 engages control arm 176 and is prevented from further movement. Thus, control pin 174 is maintained in the first pin position when engaged with control arm 176. Preventing control pin 174 from movement prevents rotor 18 from rotating. Preventing rotor 18 from rotating prevents rotor slot 20 from aligning with plunger 24 and thus prevents incorrect indication of a locked kingpin by lock indication system 16.

Figure 6:
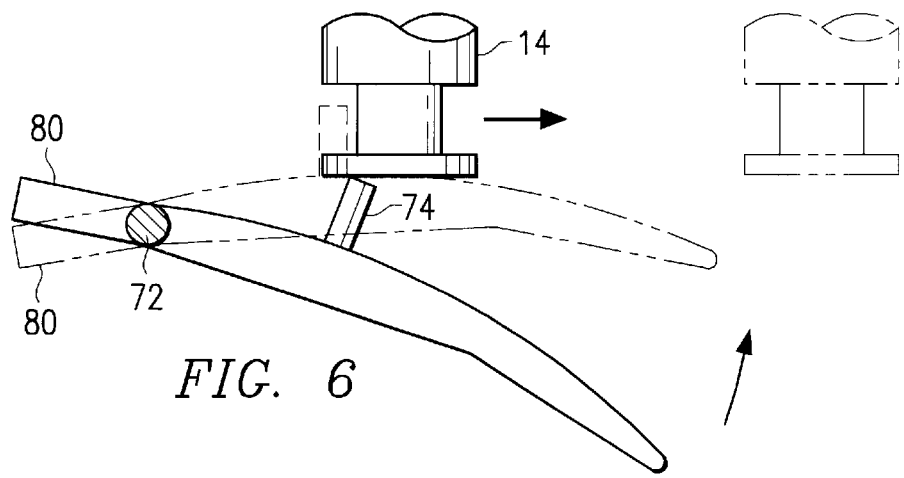
FIG. 6 is a side view of the rotor control lever with a status indicator attached thereto.

FIG. 6 is a side view of rotor control lever 70 with a status indicator 80 attached thereto. Status indicator 80 is preferably a generally-cylindrical rod. However, any suitable element that may be coupled to rotor control lever 70 and operable to indicate the status of control pin 74. Status indicator 80 may be a separate physical element attached to pivot pin 72 which pivots in response to movement of rotor control lever 70. Alternatively, status indicator 80 may be integral to rotor control lever 70. Status indicator 80 indicates whether control pin 74 is in a rotor-locked position or in a rotor-unlocked position. The rotor-locked position indicates that control pin 74 is inserted into rotor slot 20 and will prevent rotation of rotor 18. The rotor-unlocked position indicates that control pin 74 is removed from rotor slot 20 and will not prevent rotation of rotor 18.

When no kingpin 14 has been inserted into hitch 10, status indicator 80 is maintained in a lowered position (shown by the dashed lines at 80 in FIG. 6). The lowered position indicates that control pin 74 is in the rotor locked position.

When kingpin 14 has been inserted, as shown in FIG. 6, status indicator 80 is in a raised position (shown by the solid lines at 80 in FIG. 6). The raised position indicates that control pin 74 is in the rotor unlocked position.

Status indicator 80 allows a human operator of hitch 10 to determine whether rotor control lever 70 is operating and to determine whether control pin 74 is in the rotor-locked or rotor-unlocked position. Status indicator 80 allows the operator to determine if rotor control lever 70 is functioning properly. For example, if spring 76 has failed and can no longer maintain rotor control lever 70 in the raised position, status indicator 80 would be in the raised position even though no kingpin has been inserted which would indicate the need for repair of the spring.

Status indicator 80 also operates as follows. Proper insertion of kingpin 14 through channels 22 and 23 will depress rotor control lever 70 and correspondingly move status indicator 80 to the raised, or rotor-unlocked, position. Absence of kingpin 14, or improper insertion of kingpin 14 does not move rotor control lever 70 and correspondingly does not move status indicator 80 from the rotor-locked position.

Figure 7:
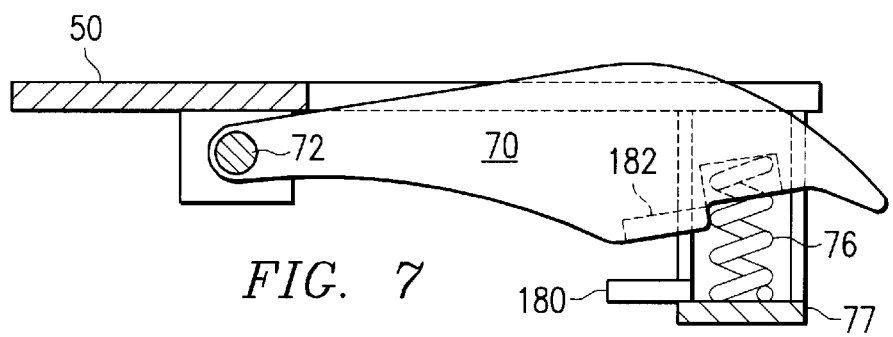
FIG. 7 illustrates an alternate embodiment of the status indicator in a rotor locked position.
Figure 8:
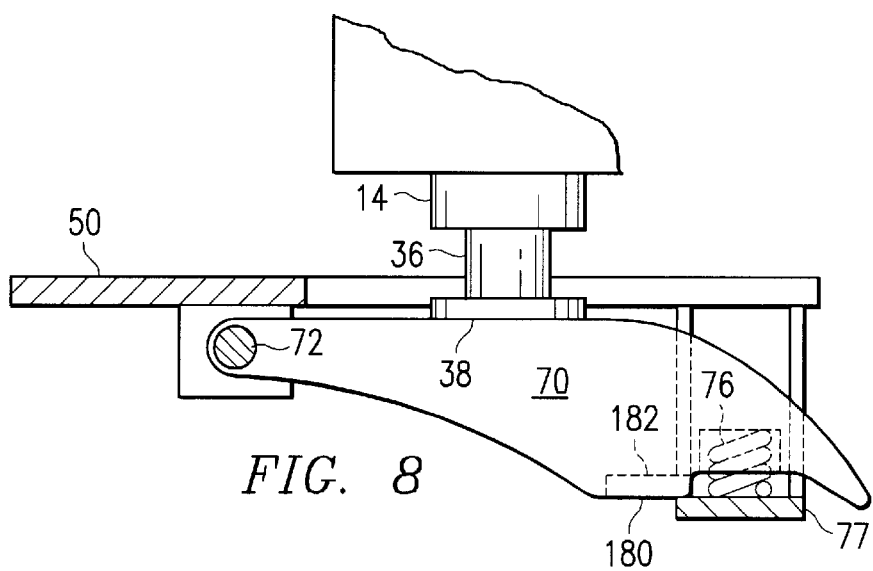
FIG. 8 illustrates the alternate embodiment of the status indicator in the rotor unlocked position.

FIGS. 7 and 8 are side views of an alternate embodiment of a status indicator. FIG. 7 illustrates a status indicator 180 in a rotor-locked position. FIG. 8 illustrates status indicator 180 in a rotor-unlocked position. FIGS. 7 and 8 are discussed together for increased clarity. Status indicator 180 is coupled to spring support 77. In this alternate embodiment of the status indicator, rotor control lever 70 further comprises a recess 182. Recess 182 is disposed entirely within rotor control lever 70 and opens downwardly through the underside of rotor control lever 70. Preferably, recess 182 extends through only a portion of rotor control lever 70.

The rotor-locked position of status indicator 180 is indicated by status indicator 180 being visible (FIG. 6). In the rotor-locked position, recess 182 is remote from status indicator 180. Rotor control lever 70 is not engaged with kingpin 14 and spring 76 maintains rotor control lever 70 in a raised position. In the raised position, recess 182 is maintained in a position remote from status indicator 180, allowing status indicator 180 to be visible.

The rotor-unlocked position of status indicator 180 is indicated by status indicator 180 not being visible. In the rotor-unlocked position, rotor control lever 70 is depressed against spring 76 by kingpin 14. Depression of rotor control lever 70 moves recess 182 such that status indicator 180 is disposed within recess 182. When status indicator 180 is disposed within recess 182, status indicator 180 is not visible because status indicator 180 is at least partially enclosed by recess 182.

Although several embodiments of the present invention have been described in detail, it should be recognized that direct connections disclosed herein could be altered, such that two disclosed components or elements would be coupled to one another thorough an intermediate device or devices without being directly connected, while still realizing the present invention. Other changes, substitutions and alterations are also possible without departing from the spirit and scope of the present invention, as defined by the following claims.

What is claimed is:

1. A hitch, comprising:
   a rotor having a kingpin receptacle; and
   a rotor control device for selectively preventing rotation of the rotor, the rotor control device comprising:
      a control lever having a control pin; and
      the control lever movable between a first position, in which the control pin is disposed within a recess of the rotor and operable to prevent rotation of the rotor when a kingpin is inserted into the kingpin receptacle, and a second position, in which the control pin is removed from the recess to allow rotation of the rotor.

2. The hitch of claim 1, further comprising a status indicator coupled to the control lever.

3. The hitch of claim 1, further comprising a rotor support plate, and a status indicator coupled to the rotor support plate, the control lever having a recess, wherein the status indicator is disposed within the recess when the control lever is in the second position and wherein the status indicator is removed from the recess when the control lever is in the first position.

4. The hitch of claim 1, wherein the control lever is operable to pivot between the first position and the second position, the control lever being biased toward the second position upon engagement by the kingpin received within the kingpin receptacle of the rotor.

5. The hitch of claim 4 further comprising a biasing device operable to bias the control lever toward the first position and wherein the control lever pivots to the second position in upon engagement by the kingpin.

6. The hitch of claim 4, wherein the rotor is operable to rotate from a first position to a second position, wherein the rotor is secured in the first position when the control pin is disposed in the recess and wherein the rotor is free to rotate from the first position to the second position when the control pin is remote from the recess.

7. A hitch, comprising:
   a rotor,
   a rotor support plate,
   a rotor control apparatus,
   a control pin coupled to the rotor and disposed within a recess of the rotor support plate;
   a control lever moveable from a first position to a second position when engaged by a kingpin;
   a control arm pivotally moveable from a first position to a second position when engaged by the control lever, the control lever engaging the control arm when the control lever is engaged by the kingpin, wherein the control arm is disposed within the recess in the first position and wherein the control arm is removed from the recess in the second position.

8. The hitch of claim 7, wherein the control pin is operable to rotate from a first pin position to a second pin position, wherein in the first position the control arm maintains the control pin in the first pin position and wherein the control pin is free to rotate within the recess when the control arm is in the second position.

9. The hitch of claim 8, wherein rotation of the rotor rotates the control pin from the first pin position to the second pin position, wherein the control arm prevents rotation of the rotor when the control arm maintains the control pin in the first pin position, and wherein the rotor is free to rotate when control pin is free to rotate to the second pin position.

10. The hitch of claim 7, wherein the control lever is operable to pivot between a raised position and a lowered position, wherein in the lowered position the control lever is engaged with the control arm and wherein in the raised position the control lever is remote from the control arm, and wherein the control lever is maintained in the raised position by a tension element.

11. The hitch of claim 10, wherein engagement with the kingpin pivots the control lever from the raised position to the lowered position.

12. The hitch of claim 10, wherein the control arm pivots to the second position in response to engagement of the control lever with the control arm and wherein the control arm is maintained in the second position when the control arm is free of engagement with the control lever.

13. A hitch system for securing semi-trailers to railroad cars comprising:
   a plate disposed within a hitch;
   a rotor rotationally coupled to the plate and having a slot disposed along an outer edge thereof;
   a lever having a first end pivotally coupled to the plate and a second end, and being engageable with a kingpin;
   a rotor control pin coupled to the lever and engageable with the slot; and
   a tension element coupled to the plate and the second end.

14. The hitch system of claim 13 further comprising:
   a first support coupled to the plate;
   a pivot pin coupled to the first support and disposed between the first support and the first end of the lever;
   a second support coupled to the plate and disposed between the plate and the tension element.

15. The hitch system of claim 13, wherein the lever is operable to pivot in response to insertion of the kingpin through a channel and disengage the control pin from the slot, and wherein the spring is operable to maintain the lever in a raised position such that the control pin is disposed within the slot when the hitch is free of the kingpin.

16. The hitch system of claim 13, wherein the rotor is prevented from rotating when the control pin is disposed within the slot and the rotor is free to rotate when the control pin is remote from the slot.

17. A hitch system of claim 13, wherein the lever further comprises a status indicator extending outwardly from the pivot pin and wherein the pivot pin extends through the lever.

18. A hitch apparatus comprising:
   a rotor having a kingpin receptacle for receiving a kingpin; and
   a rotor control mechanism comprising:
      a control lever having a control pin operable to engage a recess in the rotor when a kingpin is inserted into the kingpin receptacle to secure the kingpin within the kingpin receptacle; and
      said control lever operable to prevent the rotor from rotating if the kingpin is received improperly within the kingpin receptacle.

19. The hitch apparatus of claim 18, further comprising:
   a lock indicator movable between a first position corresponding to the kingpin being locked, and a second position corresponding to the kingpin being unlocked, the lock indicator being maintained in the second position while the rotor is prevented from rotating.

* * * * *